United States Patent [19]
Miyamoto et al.

[11] Patent Number: 4,953,163
[45] Date of Patent: Aug. 28, 1990

[54] TDM TRANSMISSION SYSTEM

[75] Inventors: Yukihiko Miyamoto, Tama; Hirokazu Kobayashi, Gyoda; Syoichi Suzuki, Tokyo, all of Japan

[73] Assignee: Kabushiki Kaisha Kenwood, Tokyo, Japan

[21] Appl. No.: 340,668

[22] Filed: Apr. 20, 1989

Related U.S. Application Data

[62] Division of Ser. No. 55,073, May 28, 1987, Pat. No. 4,884,267.

[30] Foreign Application Priority Data

| | | | |
|---|---|---|---|
| Nov. 20, 1985 | [JP] | Japan | 60-177532[U] |
| Dec. 13, 1985 | [JP] | Japan | 60-192087[U] |
| Dec. 27, 1986 | [JP] | Japan | 61-309090[U] |
| Dec. 27, 1986 | [JP] | Japan | 61-309091[U] |
| Feb. 24, 1987 | [JP] | Japan | 62-24939[U] |

[51] Int. Cl.⁵ .................................. H04J 3/06
[52] U.S. Cl. .................... 370/100.1; 375/82; 375/120; 328/63
[58] Field of Search .............. 370/100, 100.1; 375/106, 120, 81, 82, 10, 111, 119; 307/243; 328/61, 104, 110, 63, 164; 331/49, DIG. 2; 340/825.14; 358/148, 158, 264

[56] References Cited

U.S. PATENT DOCUMENTS

| | | | |
|---|---|---|---|
| 4,229,699 | 10/1980 | Frissell | 328/104 |
| 4,510,461 | 4/1985 | Dickes et al. | 331/DIG. 2 |
| 4,573,173 | 2/1986 | Yoshida | 328/63 |

*Primary Examiner*—Douglas W. Olms
*Assistant Examiner*—Wellington Chin
*Attorney, Agent, or Firm*—Sixbey, Friedman, Leedom & Ferguson

[57] ABSTRACT

A time division multiplex transmission system includes: a time division multiplex encoder for supplying a master clock to a plurality of PCM digital signal sources having a same sampling requency and a same quantization bit number to effect clock synchronization and generating a time-divisionally multiplexed data signal based on a data word not D/A converted and sampled from each digital signal source; a transmission line for transmitting the multiplexed data signal from the time division multiplex encoder; and a time division demultiplex decoder for selecting a desired transmitted, multiplexed data signal and demultiplexing the selected data signal in accordance with a transmission rate before the time division multiplexing.

1 Claim, 8 Drawing Sheets

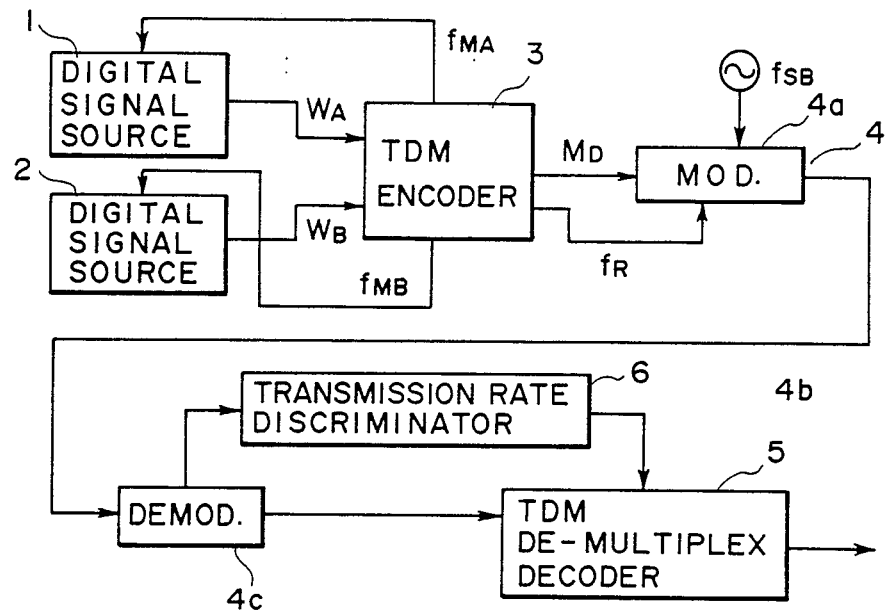
F I G. 3
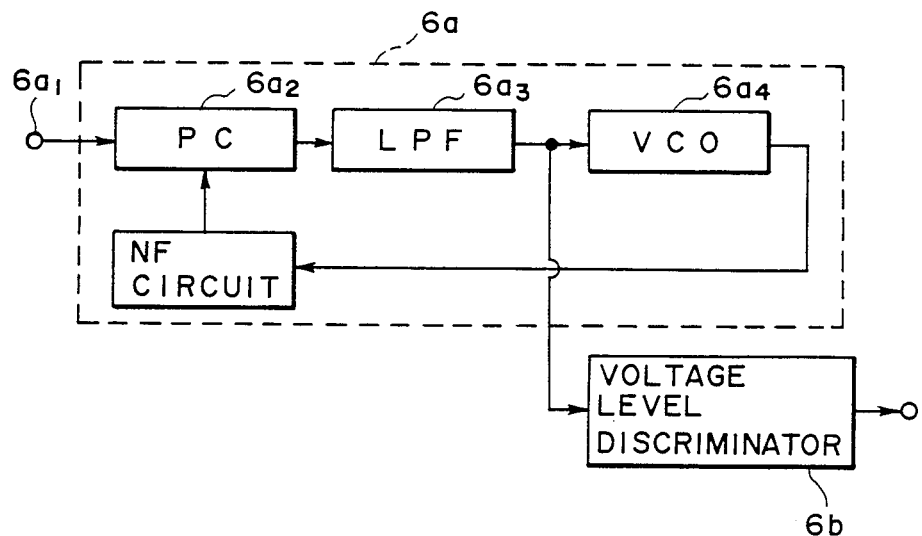
F I G. 4

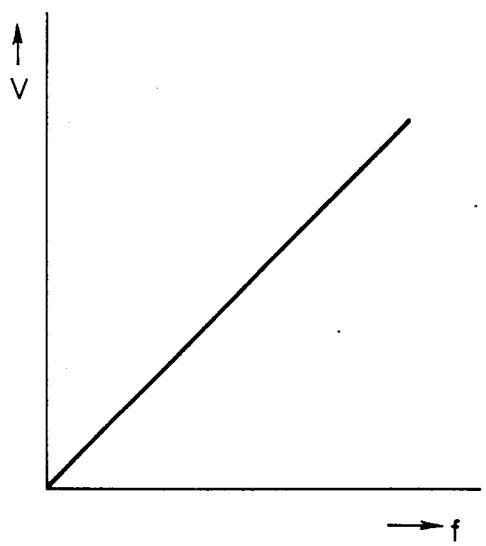
F I G. 5
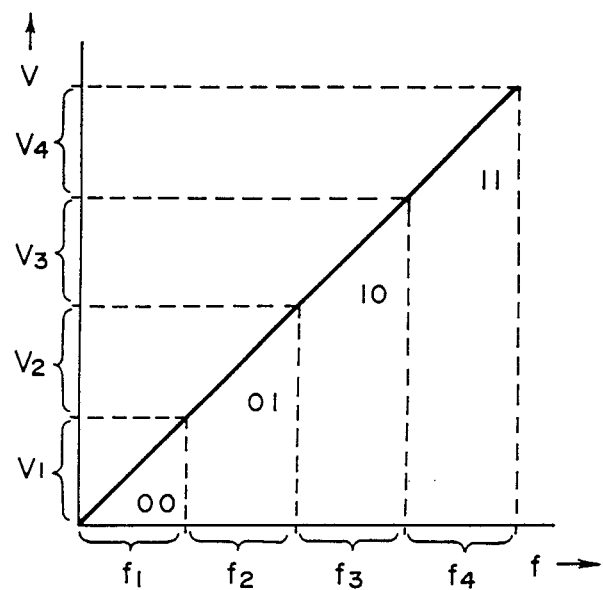
F I G. 6

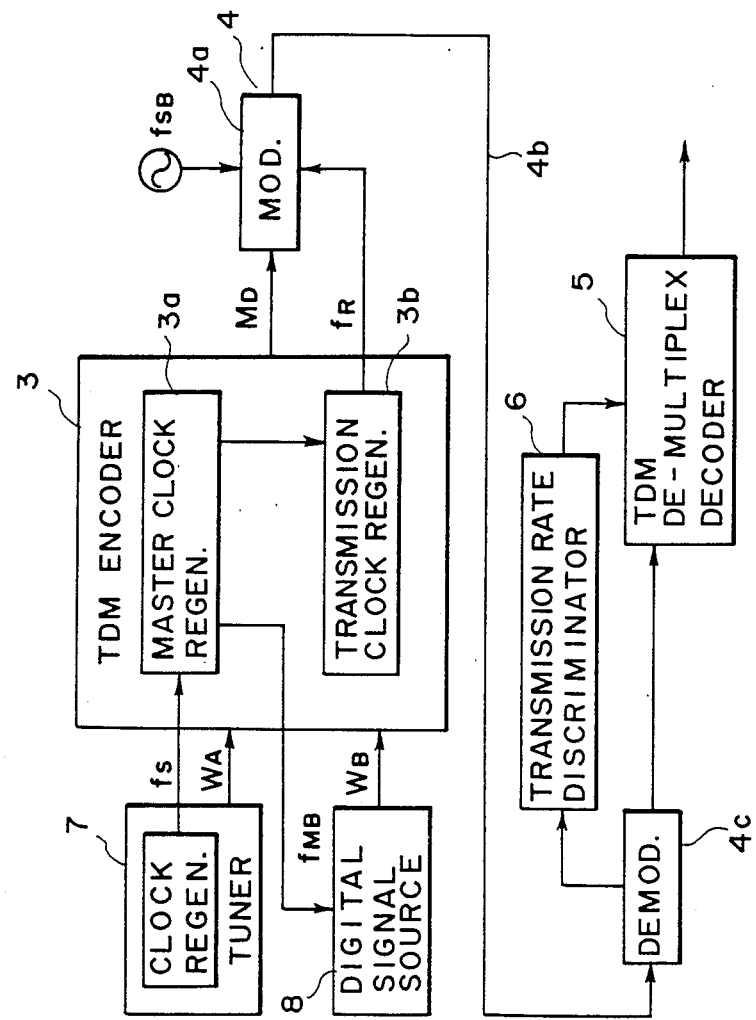
F I G. 7

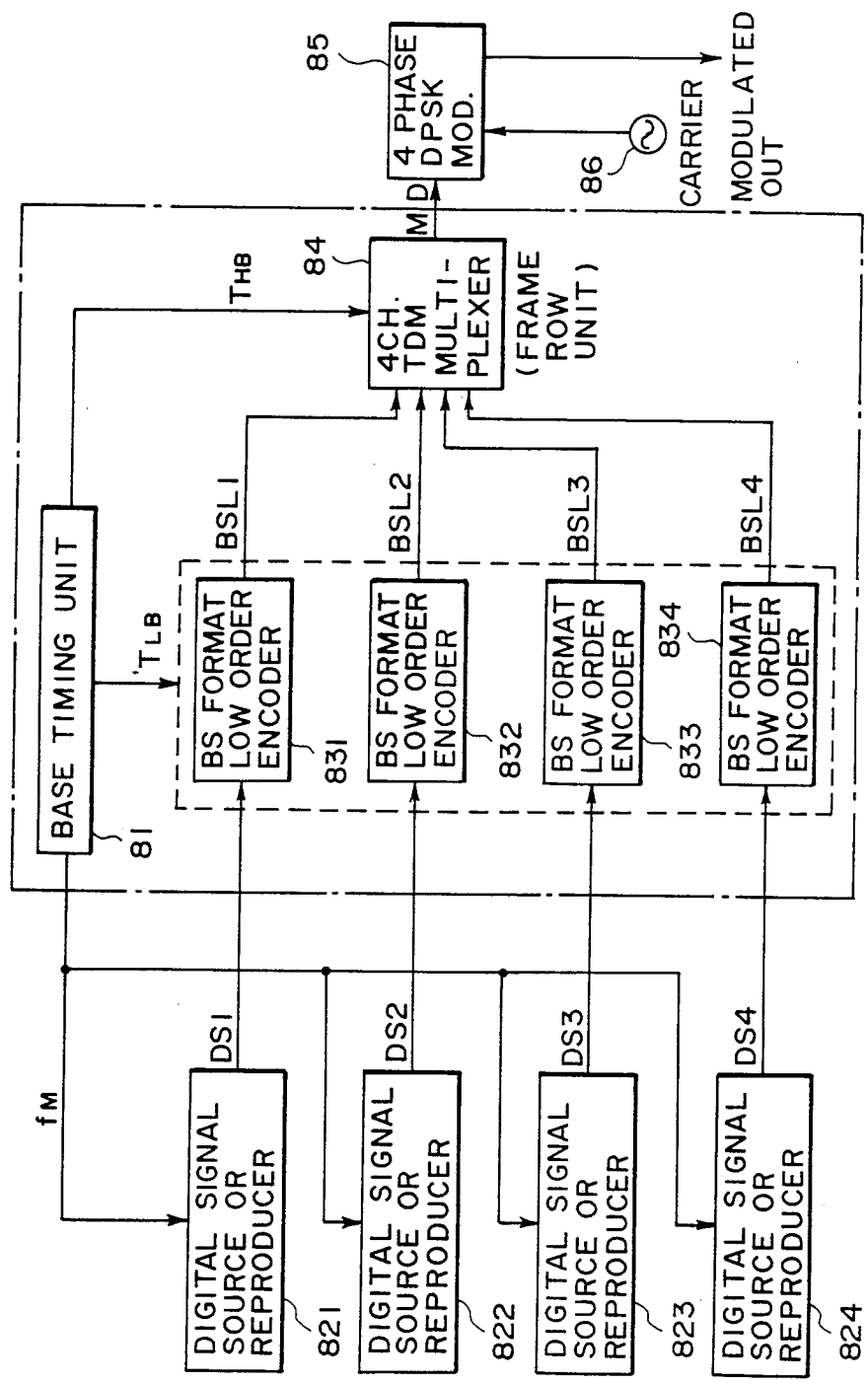
F I G. 8

TDM TRANSMISSION SYSTEM

This is a divisional application of Ser. No. 07/055,073, filed May 28, 1987, now U.S. Pat. No. 4,884,267.

BACKGROUND OF THE INVENTION

1. Field of the Invention

The present invention relates to a time division multiplex (TDM) transmission system particularly suitable for dedicated wired music broadcast, wherein a plurality of digital audio sources or the like having a same sampling frequency and a same quantization bit number are time-divisionally multiplexed, transmitted via transmission line, and demultiplexed.

2. Description of the Prior Art

In conventional dedicated wired music broadcast, various music programs are broadcasted by the frequency multiplex transmission system using a plurality of carrier frequencies.

Recently, digital audio apparatus and PCM digital audio sources are widely used. Since the bandwidth of a wired audio broadcast is not sufficient for a PCM signal to be transmitted, the PCM signal once converted into an analog signal is transmitted. Therefore the advantageous features of a digital source is not positively utilized, but the tone quantity is degraded during transmission.

Presently available PCM digital audio sources each have a different format, transmission rate, sampling frequency, and quantization bit number. Even a digital audio source regenerating apparatus of a same type has a slight difference in its transfer clock frequency, and clocks between apparatus are asynchronous. Therefore, it is difficult to time-divisionally multiplex and transmit various audio signals in a single suitable format.

In a dedicated multi-channel PCM music broadcast, analog signals are once obtained through the D/A conversion of a plurality of digital signal sources, e.g., digital regenerating apparatus such as CD players. The analog signals are again A/D converted to obtain digital signals for the plurality of channels. The digital signals are time-divisionally multiplexed, formatted and transmitted using sampled PCM words.

Signals are once D/A converted and then A/D converted so that a high fidelity PCM audio signal is degraded during such conversion. Further, in a decoding process at a receiving side, an LSI is needed to be newly developed for decoding a formatted low order frame row unit after demultiplexing from a high order to a low order.

BS-PCM audio signals of satellite broadcast (BS), digital audio signals of digital audio apparatus such as CD players and digital audio tape recorder (DAT) have been used as digital audio sources. In this case, analog signals obtained through D/A conversion are modulated and broadcasted.

It is possible to considerably lessen the degradation of tone property if digital signals are modulated and broadcasted without once converting into analog signals.

However, BS-PCM audio signals have a sampling frequency (fs) of 48 KHz, whereas digital audio signals of a commercially available digital audio apparatus such as CD player has a sampling frequency of 44.1 KHz. In addition, the format of each PCM signal is also different.

Therefore, to receive modulated PCM signals, it is necessary for the receiver to be equipped with both processors for BS format PCM signals and CD player format PCM signals. In addition, it is necessary to discriminate between the processors for the corresponding PCM signals. The provision of and discrimination between the processors result in an uneconomical and expensive receiver, and in an obstacle against practical use. It is thus desired to have a measure by which a single signal processor can handle a plurality of PCM signals.

The quantization bit number of a PCM signal of a CD player is 16 same as that of a B-mode BS-PCM audio signal. If PCM signals of a CD player are formatted into the B mode BS-PCM format, both signals can be processed by only a signal processor for the BS-PCM signals.

Although the quantization bit number is 16 for both PCM signals, the sampling frequency (fs) is 48 KHz for BS-PCM audio signals and 44.1 KHz for PCM audio signals, and hence the transmission rate is 2.048 Mb/s and 1.8816 Mb/s, respectively.

Therefore, clocks suitable for each transmission rate become necessary for demodulating PCM audio signals. Thus, a clock regenerating circuit for each transmission rate becomes necessary.

As discrimination means for transmission rates, a PLL circuit having a broad capture range has been used heretofore. Based on an input voltage to the VCO of the PLL circuit, a transmission rate discrimination signal is generated. A most suitable PLL circuit among a plurality of PLL circuits having a narrow capture range is selected to regenerate a clock in accordance with the transmission rate.

However, the above conventional transmission rate discrimination means requires a PLL circuit having a broad capture range for reducing the number of signal processors for generating a transmission rate discrimination signal, and a plurality of PLL circuits having a narrow capture range each selected by the transmission rate discrimination signal. Further, clocks corresponding to the transmission rate are required to be regenerated by the selected PLL circuit.

SUMMARY OF THE INVENTION

An object of the present invention is to provide a TDM transmission system wherein a plurality of PCM digital audio sources each having a same sampling frequency and a same quantization bit number are multiplexed, transmitted and demultiplexed.

Another object of the present invention is to provide a clock regenerating apparatus for a TDM transmission system wherein transmission rate discrimination means is provided which can discriminate a transmission rate based on a lock signal or an unlock signal of a narrow band clock regenerating circuit, without using a PLL circuit having a broad capture range as transmission rate discrimination means.

The time division multiplex transmission system according to the first aspect of the present invention comprises:

a time division multiplex encoder for supplying a master clock to a plurality of PCM digital signal sources having a same sampling frequency and a same quantization bit number for effecting clock synchronization and generating time division multiplexed data signal using a data word not D/A converted and sampled from each digital signal source;

means for transmitting said multiplexed data signal from said time division multiplex encoder; and a time division demultiplex decoder for selecting a desired transmitted, multiplexed data signal and demultiplexing said selected data signal in accordance with a transmission rate before the time division multiplexing.

According to the second aspect of the present invention, the time division multiplex transmission system of the first aspect further comprises:

transmission rate discrimination means for generating a transmission rate discrimination signal from the multiplexed data signal and operating the time division demultiplex decoder in accordance with the transmission rate discrimination signal.

The time division multiplex system according to the third aspect of the present invention comprises:

(a) a base timing unit for supplying a master clock to a plurality of PCM digital signal sources having a same sampling frequency and a same quantization bit number for effecting frequency synchronization;

(b) a low order encoder unit for obtaining a low encoder output of a predetermined format at a same timing from said base timing unit, based on a data word signal not D/A converted and sampled from each said digital signal source;

(c) a time division multiplex unit for obtaining a time division multiplex signal by time-divisionally multiplexing said low order encoder output in units of frame row;

(d) a time division demultiplex unit for demultiplexing said time division multiplex signal in units of frame row and outputting a low order signal having a predetermined format expanded in accordance with an original transmission rate; and (e) a low order decoder unit inputted with said low order signal of a predetermined format and decoding the sampled data word signal.

According to the fourth aspect of the present invention, the time division multiplex system according to the third aspect further comprises:

a digital I/O interface unit, wherein the low order encoder unit obtains a low order encoder output of a predetermined format at a same timing from said base timing unit, based on a data word signal sampled after the timing adjustment of the sampled word by said digital I/O interface unit.

The clock regenerating apparatus for the time division multiplex system according to the fifth aspect of the present invention comprises:

a lock/unlock detector for detecting a lock/unlock of at least one of a plurality of clock regenerating circuits having a narrow capture range and outputting a transmission rate discrimination signal; and a regenerated-clock changeover circuit responsive to said transmission rate discrimination signal for changing and outputting a signal processing clock.

BRIEF DESCRIPTION OF THE DRAWINGS

FIG. 3 is a block diagram showing a third embodiment of the TDM transmission system according to the present invention;

FIG. 4 is a block diagram of the transmission rate discriminator of FIG. 4;

FIG. 5 is a graph showing the V/f characteristics of the VCO of FIG. 4;

FIG. 6 is a graph showing the V/f characteristics of the voltage level discriminator of FIG. 4;

FIG. 7 is a block diagram showing a fourth embodiment of the TDM transmission system according to the present invention;

FIG. 8 is a block diagram showing a fifth embodiment of the TDM transmission system according to the present invention;

DESCRIPTION OF THE PREFERRED EMBODIMENTS

Figure 1:
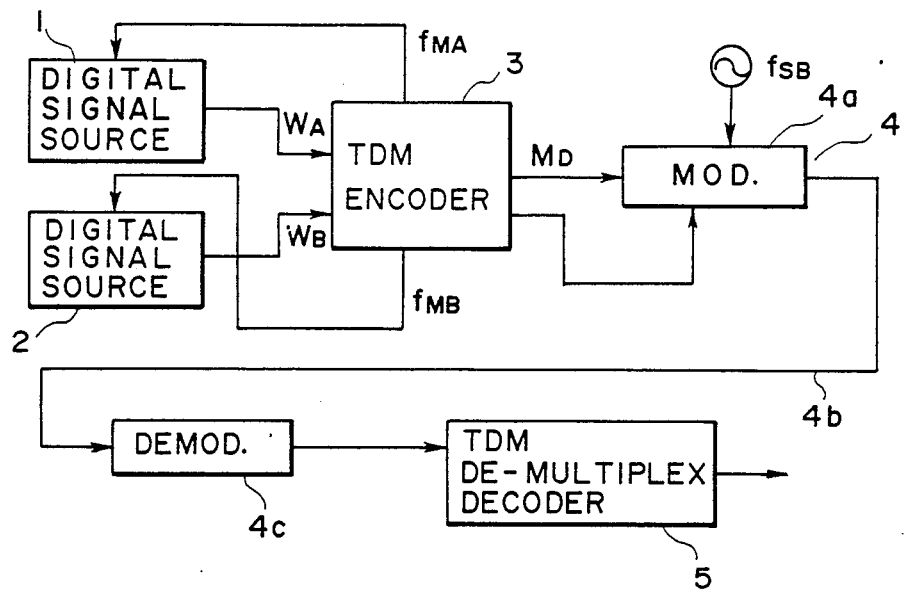
FIG. 1 is a block diagram showing a first embodiment of the TDM transmission system according to the present invention.

A first embodiment of the TDM transmission system according to the present invention will now be described with reference to FIG. 1.

In the Figure, digital signal sources 1 and 2 such as PCM digital audio sources have a same sampling frequency and a same quantization bit number. A TDM encoder 3 supplies master clocks fMA and fMB to the digital signal sources 1 and 2 for effecting clock synchronization, and sampled data words WA and WB not D/A converted are inputted from the digital signal sources 1 and 2 to the TDM encoder 3. The TDM encoder 3 outputs a multiplexed data signal MD having a TDM format including a multiplex frame synchro pattern, sampled data word (music data, announced data and the like) WA, WB, and an error correction code.

A transmission means 4 for transmitting a multiplexed data signal MD is constructed of a modulator 4a, a transmission cable 4b and a demodulator 4c at a receiving side. The modulator 4a of the transmission means 4 subjects the multiplexed data signal MD to dibit differential conversion in response to a TDM transmission clock fR from the TDM encoder 3. The differentially converted 2 bit pair then 4-phase-DPSK modulates a subcarrier fSB to transmit it over the transmission cable 4b. The demodulator 4c at the receiving side 4-phase-DPSK demodulates the transmitted signal.

A time division demultiplex decoder 5 selects one of the digital signals 1 or 2 from the 4-phase-DPSK demodulated, multiplexed data signals, demultiplexes it in accordance with a transmission rate before the time division multiplexing and decodes it into an alanog audio signal.

Next, a second embodiment of the TDM transmission system according to the present invention will be described. Similar elements to those in the first embodiment are represented by identical reference numbers and characters.

Figure 2:
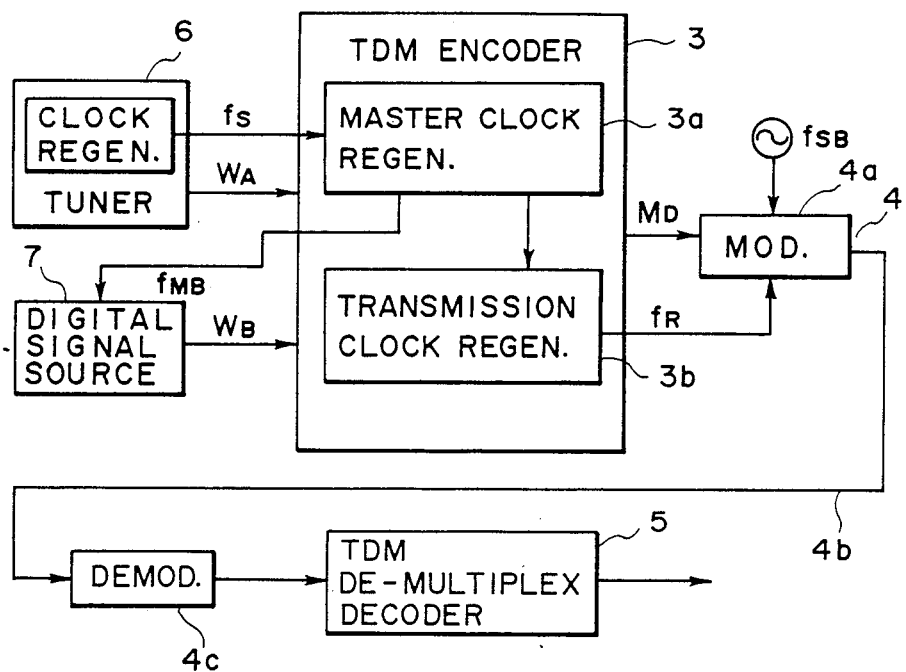
FIG. 2 is a block diagram showing a second embodiment of the TDM transmission system according to the present invention.

In the second embodiment shown in FIG. 2, PCM digital signals received from a satellite broadcast receiver tuner 6 are used as one digital signal source, whereas PCM digital signals from a compact disc (CD) player 7 are used as another digital signal source. Both digital signals are transmitted after time-divisionally multiplexed.

If digital signals received from the satellite broadcast receiver tuner 6 are to be time-divisionally multiplexed, clocks can be regenerated from the received digital signals and hence a sampling frequency fS from the master clock (VCO) of a clock regenerating circuit.

Therefore, it is not necessary to effect clock synchronization by supplying a master clock from the TDM encoder 3 as in the first embodiment. In this case, in contrast with the first embodiment, the sampling frequency fS obtained from the satellite broadcast receiver tuner 6 is supplied to the TDM encoder 3 which performs master clock regeneration 3a and transmission clock regeneration 3b. A master clock fMB obtained at the TDM encoder 3 is supplied to the other digital signal source 2 to effect clock synchronization.

The processes following the clock synchronization are executed in a similar manner to the first embodiment.

According to the first and second embodiments of the TDM transmission system, master clocks are supplied from the TDM encoder to a plurality of digital signal sources having a same sampling frequency and a same quantization bit number to effect clock synchronization and hence time division multiplex. Further, time division multiplex is executed in units of sampled data word so that a difficulty in time division multiplex due to a difference in format can be avoided. Other technical advantageous features are also obtained, for example, even digital signal sources of a different type can be time-divisionally multiplexed so long as they have a same sampling frequency and a same quantization bit number.

FIG. 3 shows a third embodiment of the present invention which has a transmission rate discriminator 6 in addition to the constituent elements of the TDM transmission system shown in FIG. 1. The transmission rate discriminator 6 is constructed of a PLL circuit 6a having a wide capture range, and a voltage level discriminator 6b for generating a transmission rate discrimination signal in accordance with a VCO input voltage of the PLL circuit 6a. The input terminal 6a1 of the PLL circuit 6a of the transmission discriminator 6 is inputted as shown in FIG. 4 with one bit signal of the 2 bit pair obtained through a 4-phase-DPSK demodulation by the demodulator 4c. A phase comparator 6a2 and a low pass filter 6a3 produce a VCO input voltage (dc voltage) to a voltage controlled oscillator (VCO) 6a3 as shown in FIG. 5 and to the voltage level discriminator 6b. The voltage level discriminator 6b has, for example as shown in FIG. 6, four voltage discrimination preset ranges V1 to V4. When a VCO input voltage is applied to the voltage level discriminator 6b, a 2 bit transmission rate discrimination signal corresponding to the VCO input voltage is produced and supplied to the time division demultiplex decoder 6. Particularly, the voltage level discriminator 6b discriminates the VCO input voltage supplied from the PLL circuit 6a and outputs a corresponding 2 bit transmission rate discrimination signal such as "00", "01", "10" and "11" for the voltage levels V1, V2, V3 and V4, respectively.

The four voltage ranges are provided because the transmission rate after time division multiplex differs depending upon the sampling frequency and quantization bit number of a data word, the number of digital sources to be time-divisionally multiplexed, and the coding rate during time division multiplex. For example, if the transmission rate is f1 bit/s when two digital sources having a same sampling frequency of 32 KHz and a same quantization bit number of 14 are time-divisionally demultiplexed, the receiving side discriminates that the VCO input voltage in the PLL of the clock regenerating circuit is within the V1 range and outputs a transmission rate discrimination signal "00" which indicates that the time division demultiplex decoding is to be executed under the above transmission rate.

Similarly, if the transmission rate is f2 bit/s when two digital signal sources having a same sampling frequency of 44.1 KHz and a same quantization bit number of 16 are time-divisionally multiplexed, the receiving side discriminates that the VCO input voltage in the PLL is within the V2 range and outputs a transmission rate discrimination signal "01" which indicates that the time division demultiplex decoding is to be executed under the above transmission rate.

As above, the transmission rate discriminator 6 discriminates VCO input voltages in the PLL circuit 6a by the voltage level discriminator 6b and outputs a transmission rate discrimination signal corresponding to the voltage level. The transmission rate discrimination signal is then supplied to the time division demultiplex decoder 5.

Thus, the time division demultiplex decoder 5 selects one of a plurality of PLL circuits having a narrow capture range in accordance with a transmission rate discrimination signal from the transmission rate discriminator 6 and regenerates a transmission clock having a small jitter to be caused by temperature drift, using one bit of the 2 bit pair from the demodulator 4c. For example, if a transmission rate discrimination signal of "00" is outputted, a PLL circuit having its oscillation frequency f1 is selected from a plurality of PLL circuits with a narrow capture range. If digital signal sources have different transmission rates and different TDM formats, time division demultiplex is executed by changeovering to a suitable digital processing timing for decoding through the transmission rate discrimination signal to decode the original signal before the time division multiplex.

FIG. 7 shows a fourth embodiment of the present invention wherein a transmission rate discriminator 6 is provided additionally to the TDM transmission system shown in FIG. 2. The operation of this embodiment can be understood from the description of the second and third embodiments shown in FIGS. 2 and 3, respectively.

The TDM transmission system according to the third and fourth embodiments has the technical advantageous features described with the first and second embodiments, and additional technical advantageous features resulted from the transmission rate discriminator. For example, if a plurality of transmission rates are present, the time division demultiplex decoding operation is executed at a timing corresponding to the transmission rate.

A fifth embodiment of the TDM transmission system according to the present invention will be described with reference to FIGS. 8 to 11.

Figure 9:
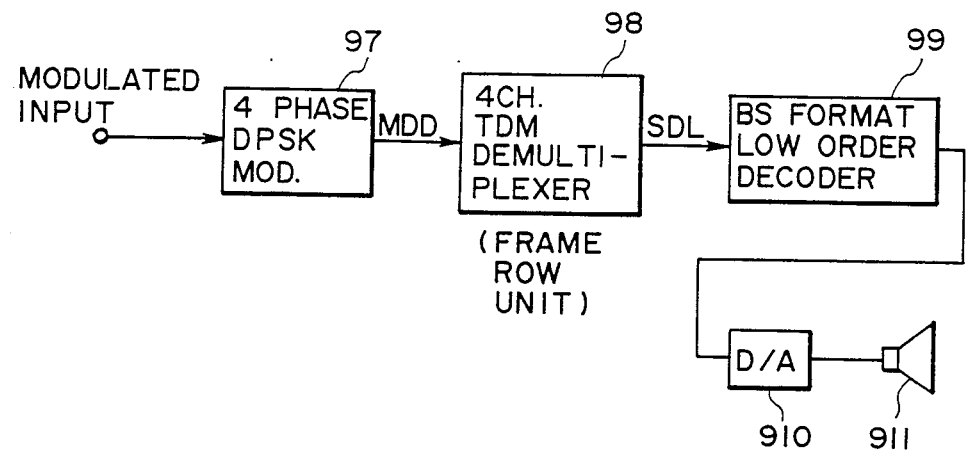
FIG. 9 is a block diagram of a TDM reception system in which a modulated signal from the circuit of FIG. 8 is received, demodulated and demultiplexed.
Figure 10:
FIG. 10 is a frame format in satellite broadcast.
Figure 11:
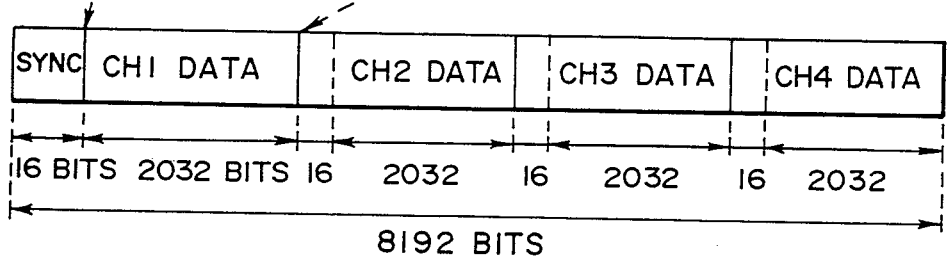
FIG. 11 is a frame format after time division multiplex.

FIG. 8 is a block diagram showing the overall structure of a 4 channel PCM audio TDM transmitter system, FIG. 9 is a block diagram showing the overall structure of a 4 channel PCM audio time division demultiplex receiver system, FIG. 10 shows the frame format in satellite broadcast before time division multiplex, and FIG. 11 shows the frame format after time division multiplex. The 4 channel PCM audio TDM transmitter system shown in FIG. 8 will be described first.

Master clocks $f_M$ are supplied to digital signal sources (or digital audio signal regenerating apparatus) 821 to 824 from a base timing unit 81 in the TDM unit to effect frequency synchronization between the TDM unit and the digital signal sources 821 to 824. The frequency synchronized, sampled PCM audio signal word and stereo changeover signal (or sampling frequency signal) DS1 to DS4 are supplied to the BS format low order encoder units 831 to 834.

The BS format low order encoder units 831 to 834 obtains BS format low order encoder outputs BS1 to BS4 from the sampled word signals DS1 to DS4 at a same timing corresponding to a timing signal $T_{LB}$ supplied from the base timing unit 81.

Next, a 4 channel TDM unit 84 time-divisionally multiplexes the encoder outputs BS1 to BS4 in units of frame to obtain a TDM'ed signal MD. A carrier from a carrier oscillator 86 is modulated by the TDM'ed signal MD and then transmitted.

The 4 channel PCM audio time division demultiplex receiver system shown in FIG. 9 is constructed of a 4 phase DPSK demodulator 97 inputted with the modulated, transmitted signal, a 4 channel time division demultiplexer 98 for demultiplexing the demodulated signal in units of frame row from the high order to the low order, a BS format low order decoder 99 for decoding into a data word signal, a D/A converter 910 for converting the data word signal into an analog audio frequency signal, and a loudspeaker 911.

The operation will be described using four CD player systems as the digital signal sources 821 to 824.

The master clocks $f_M$ are supplied to the four CD player systems from the base timing unit 81 to effect frequency synchronization between the TDM transmitter system and the four CD player systems and effect time division multiplex of the regenerated digital signals (to be sampled).

The audio sampled word not D/A converted and regenerated from each CD player system under frequency synchronization is outputted in bit serial (in stereo), and at the same time a stereo changeover signal (or a sampling frequency) is also outputted.

The digital regenerated outputs DS1 to DS4 from the CD player systems 821 to 824 are outputted to the BS format low order encoders 831 to 834.

A sampled word for each channel is inputted to the BS format low order encoder 831 to 834 to generate a BS format low order encoder signal BSL1 to BSL4 at a same timing and hence with a same phase.

The BS format low order encoder signals BSL1 to BLS4 inputted to the next 4 channel TDM unit 84 are compressed in time in units of frame row for time-divisionally multiplexing the BS format low order encoder signals BSL1, BSL2, BSL3 and BSL4 in this order. Thus, the TDM'ed high order format has at its top a 16 bit synchro pattern as shown in FIG. 11, and the following TDM'ed signals MD in the time sequential order of BSL1, BSL2, BSL3 and BSL4.

The 4 phase DPSK modulator 85 converts the inputted TDM'ed signals MD into differential dibits, to further 4-phase-DPSK modulate the carrier 86 by the differentially converted dibit and transmit the modulated signal.

The 4 channel time division demultiplex receiver system receives the transmitted modulated signal and detects the dibit signal and differentially converts it as the 4 phase DPSK demodulator 97 to regenerate an original TDM'ed signal MDD. The 4 channel TDM demultiplexer 98 demultiplexes a desired PCM audio information of a selected channel in units of frame row to output a BS format low order signal SDL expanded by the original transmission rate. The BS format low order decoder 99 made of a decoding LSI decodes the inputted BS format low order signal SDL to a data word signal.

According to the time division transmission system of the above embodiment, master clocks are supplied to the digital signal regenerating apparatus such as CD player systems to effect frequency synchronization between the TDM transmitter system and the digital signal sources. Therefore, the digital signals can be multiplexed and transmitted as they are without deteriorating the good quality of PCM audio signals from the digital signal source.

Further, a sampled data word signal is inputted to the TDM encoder so that a difficulty in time division multiplex due to the difference of format can be avoided and that even different digital signal sources can be time-divisionally multiplexed so long as they have a same sampling frequency and a same quantization bit number.

Further, the sampled audio digital word from each digital signal regenerating apparatus is time-divisionally multiplexed for each channel in units of frame row into a predetermined format. Thus it is possible to share the low order decoder after time-divisionally demultiplexing a plurality of channels. Consequently, even if the frame structure after time division multiplex becomes large due to an increase in channel number, the dimension of processing circuit at the low order does not change and an already developed LSI can be used, resulting in an economical and very practical TDM transmission system.

Figure 12:
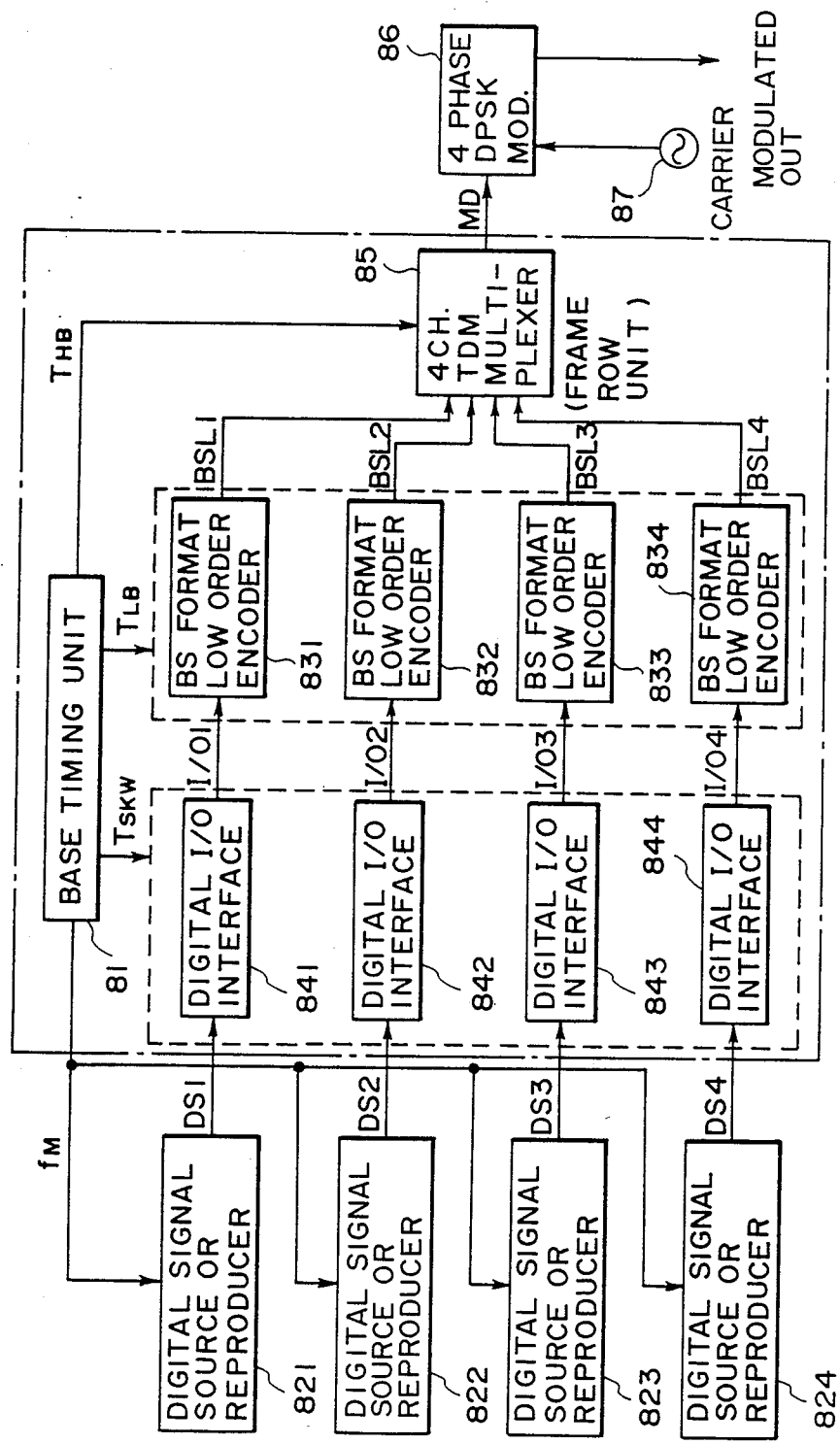
FIG. 12 is a block diagram showing a sixth embodiment of the TDM transmission system according to the present invention.

FIG. 12 shows a sixth embodiment of the TDM transmission system according to the present invention, wherein digital I/O interfaces 841 to 844 are added to the system shown in FIG. 8.

Before the sampled audio word and stereo changeover signal DS1 to DS4 from digital signal sources 821 to 824 are converted into a BS format at BS format low order encoders 831 to 834, the phase adjustment (skew adjustment) between each sampled word from the digital signal source of each channel is conducted by the digital I/O interfaces 841 to 844.

The BS format low order encoders 831 to 834 obtain, from the sampled data word signals I/O1 to I/O4 after the skew adjustment, the BS format low order encoder outputs BS1 to BS4 at a same timing as the timing signal $T_{LB}$ from the base timing unit 81.

In the embodiment of FIG. 12, assume that CD player systems are used as the digital signal sources 821 to 824. Reproduced digital outputs DS1 to DS4 from the CD player systems 821 to 824 may have a random phase difference between each sampled word and also have a random phase difference between encoding timings at the BS format low encoders 41 to 44 and each sampled word timings.

In view of this, the reproduced digital outputs DS1 to DS4 from the CD player systems 821 to 824 are loaded in a buffer memory (RAM, register and the like) in the digital I/O interfaces 841 to 844 to perform a phase adjustment (skew adjustment) between each sampled word to be supplied to the BS format low order encoders 831 to 834. Thus, the sampled word I/O1 to I/O4 after skew adjustment is supplied from each digital I/O interface 841 to 844 to the BS format low order encoder 831 to 834.

Each BS format low order encoder 831 to 834 obtains, from the inputted sampled word 1/O1 to 1/O4, the BS format low order encoder signal BSL1 to BSL4 in units of frame row at a same timing and hence at a same phase.

The TDM transmission system of the sixth embodiment has technical advantageous features described with the fifth embodiment, and additional technical advantageous features that since the frequency synchronization between all the digital signal regenerating apparatus such as CD player systems and the TDM transmitter system is effected by supplying master clocks from the latter to the former and since the digital I/O interface output having a standard transmission format is used for modulating and demodulating using an already developed demodulating LSI, the digital signal regenerating apparatus used as the digital signal sources can be used without modifying them, the digital I/O interface output per see can be used, and an interface to the TDM transceiver system can be readily realized.

Figure 13:
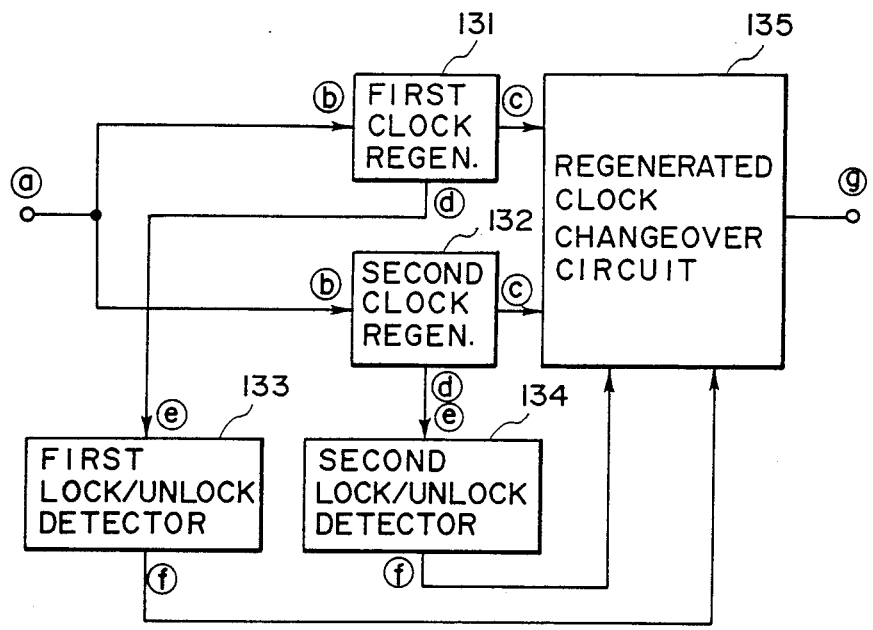
FIG. 13 is a block diagram showing an illustrative embodiment of the clock regenerating apparatus of the TDM transmission system according to the present invention.

FIG. 13 is a block diagram showing the structure of an advantageous clock regenerator in the TDM transmission system.

In this embodiment, 4 channel PCM signals from CD players converted into a BS-B mode format, and 4 channel PCM signals from BS tuners at B mode, are used in demultiplexing.

The transmission rate of the multiplexed PCM signals from the CD players becomes 7.5264 Mb/s and that from BS tuners 8.192 Mb/s. First and second clock regenerators 131 and 132 shown in FIG. 13 are used respectively for the transmission rates 7.5264 and 8.192 Mb/s.

Figure 14:
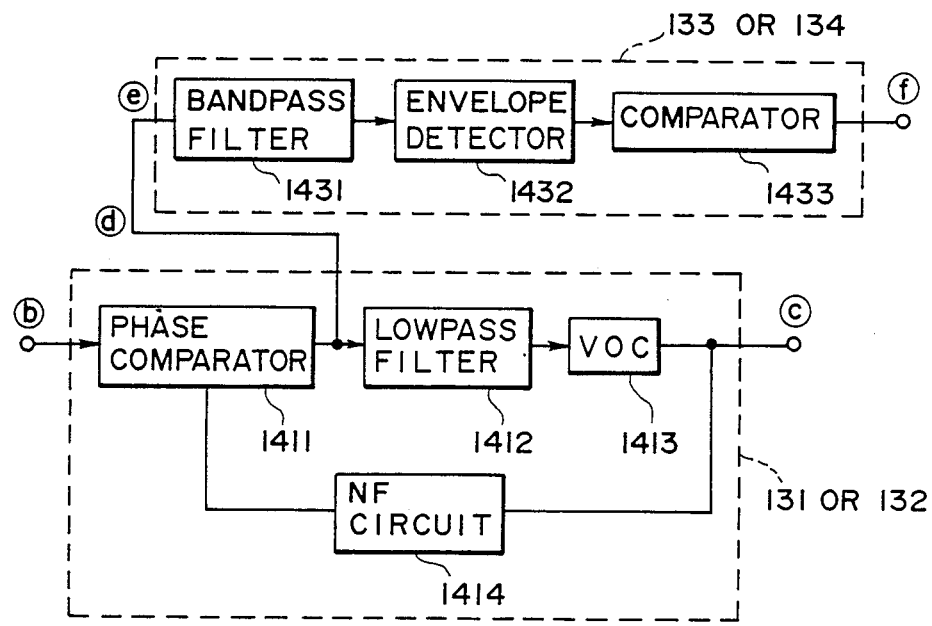
FIG. 14 is a block diagram showing an illustrative embodiment of the clock regenerating circuit of FIG. 13.

The first and second clock regenerators 131 and 132 are of a PLL circuit arrangement as shown in FIG. 14, and each constructed of a phase comparator 1411, a low pass filter (LPF) 1412, a voltage controlled oscillator (VCO) 1413, a negative feedback circuit 1414, and a regenerated-clock output terminal ⓒ.

First and second lock/unlock detectors 133 and 134 detect the lock/unlock of the inputted signal and output a transmission rate discrimination signal.

The first and second lock/unlock detectors 133 and 134 are each constructed of a band pass filter (BPF) 1431 for detecting an output ⓓ from the phase comparator 1411 of the clock regenerator 131 or 132, an envelope detector 1432, and a comparator 1433.

In this embodiment, the first and second clock regenerators have the corresponding two lock/unlock detectors 133 and 134. However, only one of them may be used.

A regenerated clock changeover circuit 135 selects outputs ⓒ from the clock regenerators 131 and 132 in accordance with a transmission rate discrimination signal outputted from one of the lock/unlock detectors 131 and 134, to thereby output a regenerated clock to an output terminal ⓖ, the clock corresponding to the transmission rate.

In this embodiment, a baseband signal demodulated by a demodulator (not shown) is supplied to the input terminal ⓐ which is in turn inputted to the input terminals ⓑ of the first and second clock regenerators 131 and 132.

The first and second clock regenerators 131 and 132 have a narrow capture range so that the regenerators are responsive only to the corresponding transmission rate (7.5264 Mb/s or 8.192 Mb/s). If the regenerator does not detect a lock of the inputted signal, then a difference between the frequency of the inputted signal and that of a free running signal of the VCO 1413 appears at the output ⓓ of the phase comparator 1411. The output from the phase comparator 1411 is detected by the band pass filter 1431 and the envelope detector 1432 of the lock/unlock detector 133 or 134 to pass it to the comparator 1433. An unlock signal for a transmission rate discrimination signal obtained at the output terminal ⓕ of the comparator 1433 makes the output ⓖ regenerated-clock changeover circuit 5 select the transmission rate from the other clock regenerator.

According to the regenerator of this embodiment, a regenerated clock can be selected in accordance with the transmission rate, without using a specific transmission rate discriminator. In addition, advantageously the circuit construction is simple and economical and readily practiced.

What we claim is:

1. A clock regenerating apparatus for a time division multiplex transmission system comprising:

a plurality of clock regenerating PLL circuits, each being responsive to the transmission rate of a received time division multiplexed signal to regenerate a clock signal;

a lock/unlock detector for identifying which one of said plurality of clock regenerating PLL circuits is locked to the transmission rate and outputting a transmission rate discrimination signal representative of the identified clock regenerating PLL circuit; and a regenerated clock changeover circuit responsive to said transmission rate discrimination signal for selecting the clock signal regenerated from the identified clock regenerating PLL circuit as a signal processing clock, wherein said lock/unlock detector comprises a plurality of detector units which respectively detects the lock/unlock condition of said plurality of clock regenerating PLL circuits.

* * * * *